Oct. 24, 1967  T. W. CARVER  3,349,394
RADAR SENSING SYSTEM
Filed Dec. 23, 1965  2 Sheets-Sheet 1
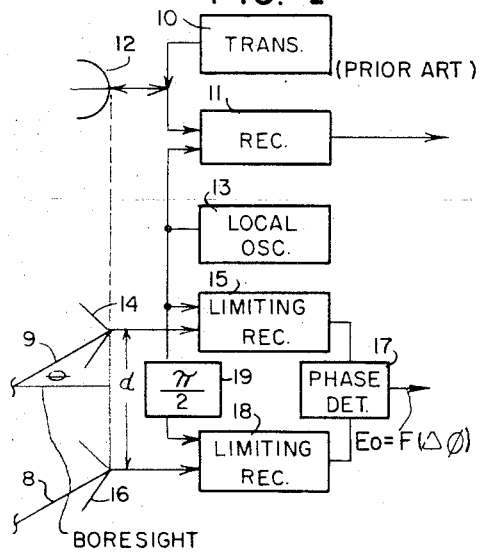
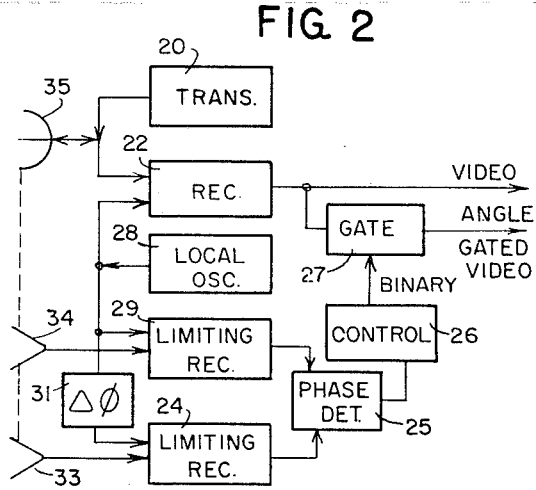
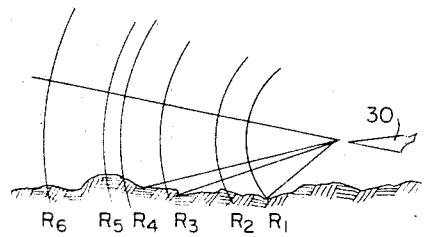
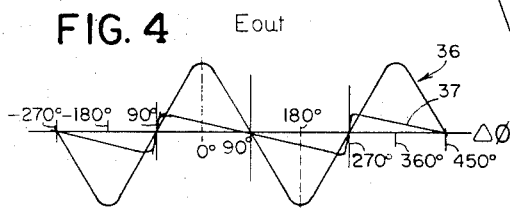
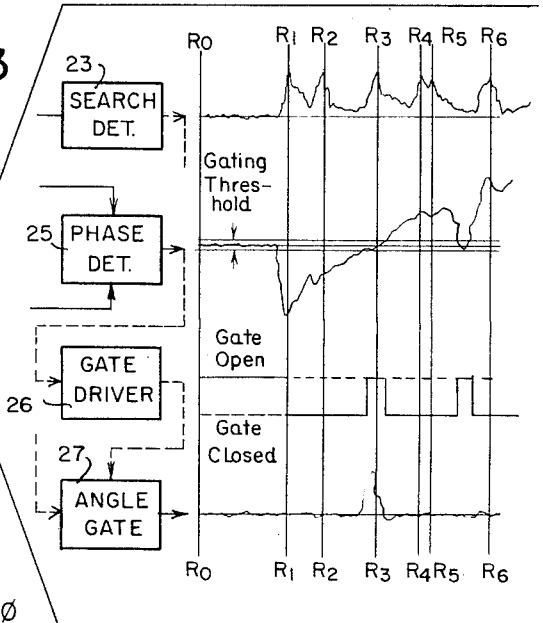
Inventor
THURMAN W. CARVER
By
Mueller, Aichele and Kauner
Attys.

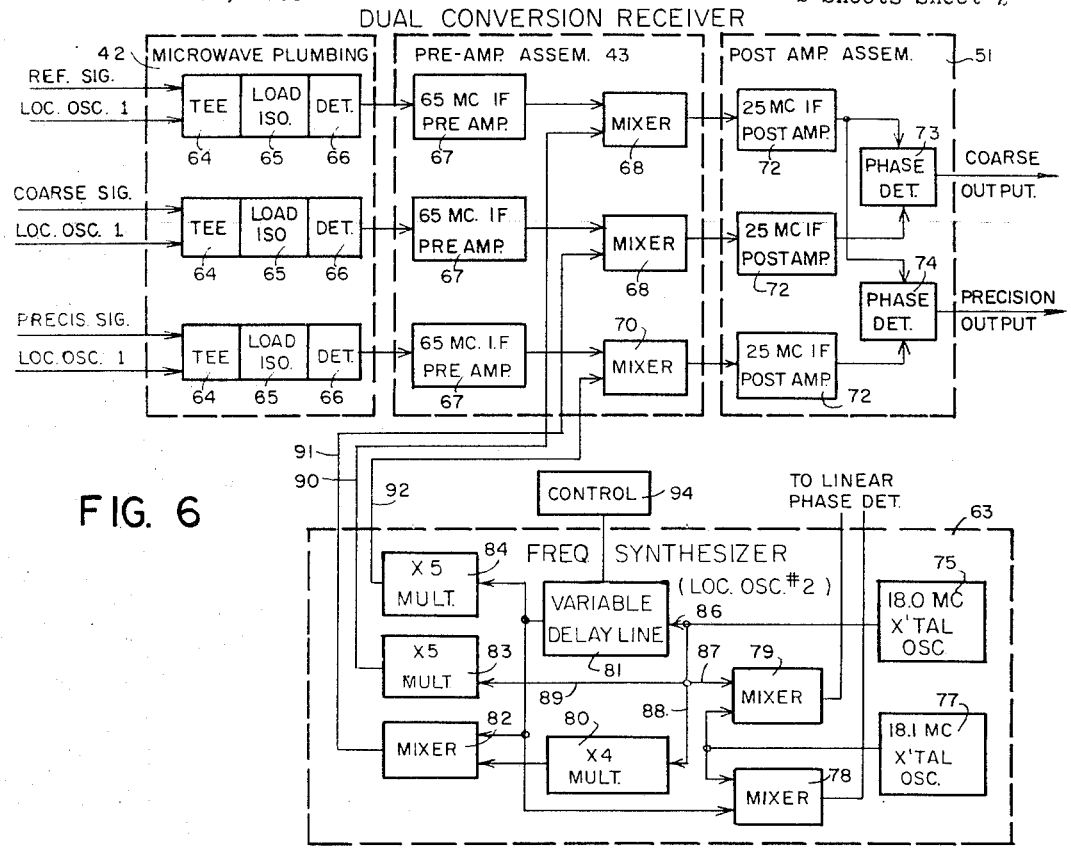
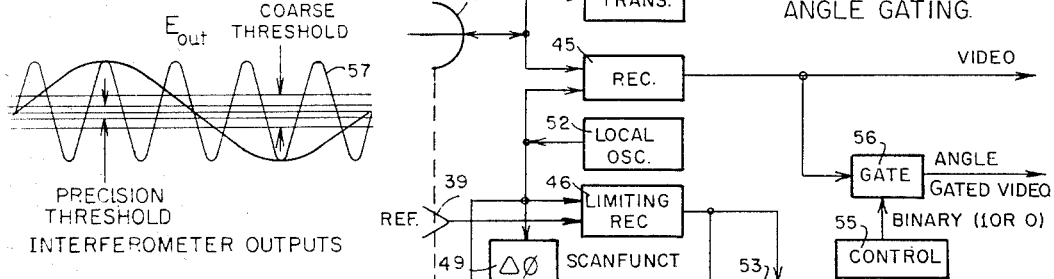
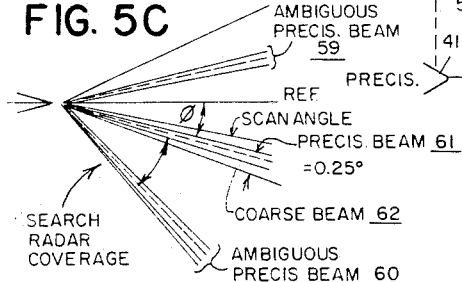
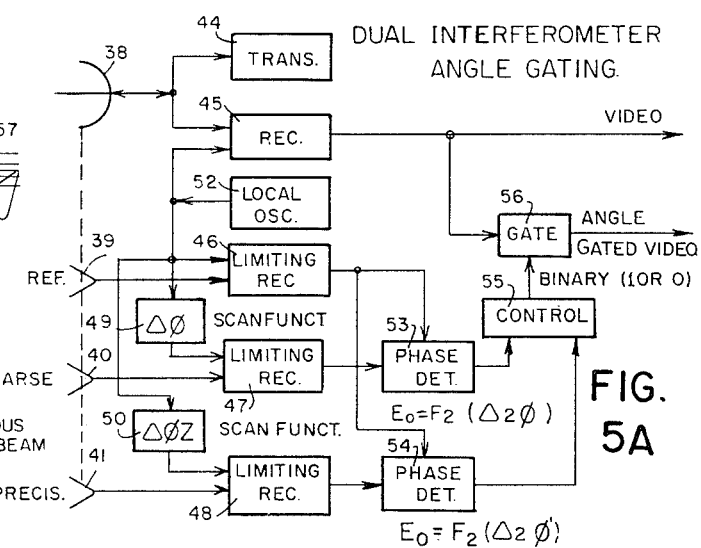

United States Patent Office 3,349,394
Patented Oct. 24, 1967

3,349,394
RADAR SENSING SYSTEM
Thurman W. Carver, Phoenix, Ariz., assignor to Motorola, Inc., Franklin Park, Ill., a corporation of Illinois
Filed Dec. 23, 1965, Ser. No. 516,055
12 Claims. (Cl. 343—16)

ABSTRACT OF THE DISCLOSURE

A radar receiver having spaced apart directive receiving antennae supplying intercepted signals to a phase detector. Upon detection of a predetermined phase relation (an angle indication) a circuit gate is opened to pass signals intercepted by yet another antenna. The disclosed apparatus is suitable for nose radar in low flying aircraft having a monopulse radar transmitter.

---

The present invention relates generally to radar receiving systems and more particularly to an improved multiple interferometer radar receiver which is gated by the angle of arrival of signals in the elevation plane of the radar set.

A microwave interferometer is a receiving device capable, within certain restrictions, of sensing signal angle of arrival to a higher degree of accuracy than the resolution possible with the available antenna aperture. In its least complex form, an interferometer consists of two receiving elements with the phase centers thereof displaced on opposite sides of and equal distances from the imaginary boresight plane of the radar receiving apparatus. If a point source radiator (or scatterer) is located anywhere in the boresight plane extending between these phase centers, the energy received by the two receiving elements will have been propagated over equal path lengths, and the induced signals arriving at the receiving elements will be in phase. However, if the source of radiation is located at a position that is not in the boresight plane, then the propagation paths will differ and the phase of the signal induced in one receiving element will lead the phase of the signal induced in the other receiving element. This amount of phase lead $\phi$ is proportional to the elevation angle of arrival $\theta$ measured with respect to the boresight plane, hereinafter referred to as the angle of arrival $\theta$. By processing the signals induced in the receiving elements, the so called angle of arrival $\theta$ can be determined and this information is useful in determining the relative elevation angle of the detected radar target.

In theory, an interferometer is useful only for isolated point targets. However, when the elevation dimension is the dimension of interest and when the propagated pulse duration is short and the azimuth physical beam width of the transmitting antenna is relatively narrow, then most radar terrain echoes approximate the characteristics of returns from point targets. Thus, the interferometer principle and the relationship between angle of arrival $\theta$ and the induced phase angle $\phi$ is useful as a means for continuously measuring elevation angle of arrival $\theta$.

A prior art technique for mechanizing an interferometer radar for the purpose of continuously measuring the angle of arrival $\theta$ in an elevation plane is illustrated by the block diagram in FIG. 1. The radar shown in this highly simplified block diagram consists of an ordinary search radar antenna 12 with associated transmitter 10 and receiver 11 for producing a video signal at the output terminal of receiver 11. To the radar antenna 12 has been added a pair of interferometer apertures 14 and 16, and these apertures are attached to the search radar antenna so that the entire assembly is scanned in azimuth by a common mechanism; therefore, the three apertures always point to the same azimuth angle. The phase centers of apertures 14 and 16 are separated a distance $d$, and the signal paths 8 and 9 cross the boresight plane at angle $\theta$.

The terrain above which the transmitter is located is illuminated by signals from the radar transmitter, and the back-scattered signals from the terrain are received by all three apertures 12, 14 and 16. These signals are applied to signal processing circuitry including receiver 11 and limiting receivers 15 and 18 and are mixed in receivers 11, 15 and 18 with a signal from a local oscillator 13. A 90° phase shifter 19 provides a phase shift in the local oscillator signal applied to the inputs of receiver 18 and phase detector 17 is connected to the outputs of receivers 15 and 18 for providing a voltage which is proportional to the phase difference between the incoming signals at apertures 14 and 16. The intermediate frequencies produced at the output of the receivers 15 and 18 retain the relative phase relationship of the input microwave signals at apertures 14 and 16 and this phase relationship must be preserved while passing through the IF amplifier stages. Therefore, the IF amplifiers in the receiving circuitry 15 and 18 must be matched in phase response if this phase relationship is to be preserved, and the signals in each of the receivers 15 and 18 must be limited before they are applied to the phase detector 17 so the phase detector output will not be amplitude dependent.

The characteristics of the phase detector 17 are such that no output occurs when the two input signals at the phase detector are exactly in quadrature. When the relative phase relationship is any other than 90°, the phase detector produces a voltage that is either positive or negative, depending upon whether the phase difference $\phi$ is greater or less than 90°. The amplitude of the phase detector output is determined by the absolute magnitude of this relative phase difference, provided the input signals are at the limit level. When backscatter signals arrive at the apertures 14 and 16 in phase (the source of backscatter being in the boresight plane), the outputs of the receivers 15 and 18 will be in exact quadrature and the output of the phase detector 17 will be zero.

The block diagram of FIG. 1 represents the prior art off-boresight phase monopulse mechanization technique, and the term "off-boresight" refers to a system of the type shown in FIG. 1 where voltage analog information is used to determine angle of arrival $\theta$. The analog voltage at the output of the phase detector 17 is generated as a function of range delay and is repeated at the radar ranging rate.

In the prior art off-boresight phase monopulse system, the phase detector is the precision element. The accuracy of the elevation angular measurement $\theta$ is directly related to the fidelity of the phase detector and to the degree to which the voltage analog information at the phase detector output can be preserved in the post detector processing devices.

A major disadvantage of the system shown in FIG. 1 is that there exists a fundamental ambiguity in its operation when the phase detector output is zero. This ambiguity results from the fact that the phase detector has an output voltage of zero which corresponds to (1) the condition when a target is on-boresight and (2) to the condition when there is no signal received by the interferometer. In prior art systems it has been a common practice to attempt to overcome disadvantages associated of this ambiguity by ascertaining prior knowledge of terrain geometry. The predictable nature of the terrain geometry permits a reasonable degree of ambiguity resolution by means of peak detection and smoothing.

It is an object of the present invention to overcome the prior art disadvantages associated with resolution ambiguity when a target is on-boresight.

Another object of the invention is to provide a radar sensing system which accepts video information only when a target (as instantaneously defined by a phase scanning apparatus) is on-boresight.

Another object of the invention is to provide positive control for gating circuitry associated with the radar receiver to insure that no video signal appears at the radar circuit output when the angle of arrival is other than along the interferometer boresight. No output video is present in the absence of an input signal, since no signal is present in the amplitude receiver channel.

Another disadvantage of the classical off-boresight phase monopulse system is related to another ambiguity which is caused by the physical arrangement of the antenna arrays, as distinguished from the electrical ambiguity of the phase detector 17. By referring to FIG. 1, it can be seen that an ambiguous condition occurs when the angle of arrival $\theta$ exceeds $2\pi$ radians or 360°. This condition is governed by the displacement between the phase centers of interferometer apertures 14 and 16, and this displacement governs the sensitivity of the interferometer in terms of degrees of electrical phase shift per degree change in space angle of arrival of the radar signal. Therefore, the physical ambiguities of the prior art off-boresight system are established by the design parameters of the interferometer antenna system.

It is another object of the invention to overcome the disadvantages associated with these last-mentioned physical ambiguities by providing a signal processing system having an antenna aperture spacing arrangement which prevents ambiguous lobes from giving false information regarding angle of arrival $\theta$.

Another object of the invention is to provide an on-boresight phase monopulse multiple interferometer system which has a much improved interferometer angular sensitivity (relationship between the degrees of electrical phase shift and degrees of space angle rotation).

Another object is to provide a system that permits angular measurement accuracies that are as much as 8 orders of magnitude better than previous systems without ambiguity interference at any point.

A feature of the present invention is the provision of a radar receiver including a multiplicity of spatially separated elements for receiving signals arriving simultaneously from a single source and phase detecting equipment for comparing the relative phase difference in the incoming signals and producing output voltages proportional thereto. An angle gate is connected to the output of the phase detecting equipment and this gate is permitted to pass amplitude channel video only when the phase information indicates an on-boresight space angle of arrival.

Another feature of the invention is the provision of a multiplicity of signal processing channels connecting the spatially separated receiving elements to the input of the phase detecting equipment. A phase scanning device is connected between the signal processing channels for inserting calibrated phase differences between the channels in order to provide a zero output voltage at the output of the phase detector for any desired space angle of arrival, thereby making it possible to continuously scan a terrain. Such a continuous scan enables the on-boresight phase monopulse system to continuously examine the profile of the terrain in much the same manner as a conventional radar with an antenna aperture of sufficient size to generate a very narrow beam, and with a mechanical scanning capability. In the present invention the servo loop controlling the phase scanner rather than the phase detector is the precision element of the radar sensing system.

Another feature of the invention is the provision of a system of the type described above which includes reference, coarse and precision channels. The receiving elements in the reference and precision channels are separated by a greater distance than the receiving elements in the reference and coarse channels thereby enabling the signals arriving at the reference and precision channels to undergo a greater relative phase shift for a given variation in angle of arrival $\theta$ than the phase variation between signals arriving at said reference and coarse channel receiving elements. Phase detectors are connected respectively to the reference and coarse channel outputs and to the reference and precision channel outputs, and a control circuit is connected between the phase detector outputs and the input of an angle gate. The angle gate is open to pass signals from the source when both detector outputs are zero plus or minus a small threshold voltage adjusted in the control circuits. This type of precision and coarse channel arrangement greatly enhances the sensitivity of the radar system while eliminating all interferometer ambiguities Another feature of the invention is the provision of a synchronous scanning frequency synthesizer network connected to the coarse and precision channels for simultaneously varying the phase difference between the signals in said coarse and precision channels by using a single voltage controllable delay line element.

The invention to be described is illustrated in the accompanying drawings wherein:

FIG. 1 illustrates the prior art off-boresight system previously described.

FIG. 2 is a functional block diagram of the invention employing a single phase scanner and a single phase detector in combination with a pair of interferometer apertures.

FIG. 3 is a diagram of the angle gate processing circuits and an illustration of the angle-gated principle to be described with reference to FIG. 1.

FIG. 4 illustrates voltage versus phase angle characteristics of two types commonly used phase detectors.

FIG. 5A is a block diagram of the dual interferometer angle gating system having coarse and precision channels;

FIG. 5B shows the output voltage waveforms for the phase detectors in FIG. 5A;

FIG. 5C illustrates the beam widths of the coarse and precision beams produced by the system of FIG. 5A; and FIG. 6 is a dual conversion receiver incorporating the coarse and precision channels of FIG. 5A into a dual conversion superheterodyne receiver arrangement with synchronous control for controlling phase scan in the coarse and precision channels.

In its most basic form, the on-boresight phase monopulse radar system of the invention includes a pair of spatially separated elements for receiving signals arriving simultaneously from a single source, either direct or reflected, and means for comparing the phase of signals at the pair of receiving elements in order to produce an output voltage proportional thereto. A gate is connected to the output of the phase detector and it is responsive to a zero voltage output to enable signals from the source to pass through this gate, referred to hereinafter as an angle gate. Since the phase detector normally produces a zero output voltage when the signals applied thereto are in quadrature, there is an ambiguity for two possible conditions at the phase detector: no signal and phase quadrature. Therefore, by using the phase detector information to control a gate placed in series with the video path of the amplitude receiver, the no signal-phase quadrature ambiguity may be resolved.

In a more complex form, the invention includes coarse and precision channels, each having receiving elements spaced at different distances from the receiving element in a common reference channel. As the angle $\theta$ at which incoming signals intersect the boresight plane changes a given amount, the phase variation between signals arriving at the precision and reference channel receiving elements is much greater than the phase variation between signals arriving at the coarse and reference channel receiving elements. A phase detector is connected at the output of the precision and the coarse channels and the requirement for both detector outputs to go to zero prior to opening the angle gate greatly enhances the sensitivity of the system relative to a single interferometer system while eliminating ambiguities.

Referring in detail to the drawings, there is shown in FIG. 2 the basic on-boresight phase monopulse interferometer system of the invention. The search radar includes transmitter 20 and receiver 22 coupled to the common transmitting and receiving antenna 35. The antenna arrangement in FIG. 2 is identical to that of FIG. 1 with apertures 33 and 34 mechanically attached to the search radar antenna 35 so that the entire antenna assembly can be scanned in azimuth by a common mechanism. A local oscillator 28 is connected to receivers 22, 24 and 29 and phase shifter 31 is connected between the receivers 29 and 24 in order to provide a means for scanning the phase detector boresight to the desired angle in space. An inhibiting type gate 27 is controlled by the output of the phase detector and this gate is closed (video cannot pass) whenever a positive or negative voltage in excess of the gating thresholds appears at the phase detector output. The phase detector controlled gate 27 receives video from the radar search channel 22 and this video signal appears at the gate output only when phase detector 25 senses a null condition (phase quadrature). Essentially, the gate 27 passes video that is returned from a target in the interferometer boresight plane (the special position of which is controlled by the variable phase shifter) and rejects the video from targets at all angles other than on-boresight (as defined by zero output from the phase detector). Thus, the system of FIG. 2 provides an angle gating capability.

The angle gated principle described above is illustrated in FIG. 3 which shows an aircraft 30 in flight over a hypothetical section of terrain. The search radar antenna illuminates a broad elevation angle as shown and radar ranges $R_0$ to $R_6$ are indicated on the sketch of the hypothetical terrain.

The angle gate processers on the right-hand side of FIG. 3 and the associated waveforms for the individual components therein further illustrate the on-boresight angle gating principle. The upper video waveform of FIG. 3 represents the output of the search detector 23 of the radar receiver 22 of FIG. 2. The phase detector 25, gate driver 26 and angle gate 27 correspond to the angle gate processing circuitry 25, 26 and 27 in FIG. 2.

There is no signal return in the interval from $R_0$ to $R_1$ and at range $R_1$ a transmitted pulse is reflected from the terrain and shows up in the output of search detector 23. Between $R_1$ and $R_2$ there is a change in terrain reflectivity and this is shown by the amplitude variation of video in the output of the search detector 23. Similar changes in reflectivity are shown for the rest of the video waveform, and between $R_5$ and $R_6$ the radar return drops to zero because of the shadow zone shown on the section of hypothical terrain.

The second waveform in FIG. 3 (phase detector output) is shown between the pulsing ranges $R_1$ through $R_6$. At the range $R_1$ the phase detector processes the video return and the voltage output is negative, indicating that the intersection of $R_1$ with the terrain is below the boresight plane of the search radar. From range $R_1$ to $R_3$ the voltage output of the phase detector 25 increases towards zero, indicating that the angle of arrival at the boresight plane is becoming less negative. Since the output amplifiers in the receiving circuits 24 and 29 have a limiter stage, the amplitude variation of the phase detector output voltage is due primarily to phase changes between the two signals arriving simultaneously at antenna apertures 33 and 34 in FIG. 2. However, a slight dip will be observed immediately preceding $R_2$ due to the low reflectivity of the terrain, and this indicates that the limiter stage in the IF amplifier did not limit, allowing some amplitude variation to show up in the output trace. As will be better understood later, such a variation is troublesome with prior art systems but does not effect the operation of the multiple interferometer system of the present invention at all. At range $R_3$ the phase detector output voltage is zero indicating that the point at range $R_3$ from which the signals are reflected lies in the boresight plane. Beyond $R_3$ the voltage continues to rise, indicating that the angle of arrival $\theta$ is above the boresight plane. Between ranges $R_5$ and $R_6$, the phase detector output once again drops to zero because of the shadow zone of the type previously described. This shadow zone or region of no signal reflection causes the output of the phase detector 25 to drop to zero, a voltage level simulating the phase detector output at $R_3$.

The state of the gate driver 26 is changed by the existence of a threshold level at the output of phase detector 25, and gate 26 is open upon the application of a zero voltage between $R_5$ and $R_6$ as well as at $R_3$. The gate driver 26 produces a binary 1 or 0 as the analog voltage output of the phase detector 25 crosses the 0 volt axis or enters the threshold region shown between $R_1$ and $R_6$.

The angle gate 27 is an AND gate and is connected to the output of the gate driver 26 and to the output of the search detector 23. Angle gate 27 provides an output voltage only (1) when the gate driver 26 is open and (2) when there is actual video output from the search detector 23. This arrangement thus resolves the ambiguity for the no signal-quadrature signal zero voltage output at the phase detector 25.

The above discussion illustrates the on-boresight angle gating principle for a single value of phase shift $\phi$ between receivers 24 and 29. It is possible, however, to electronically scan the interferometer boresight angle $\theta$ to any point within the illumination pattern of the search antenna simply by introducing a controlled phase shift $\Delta\phi$ in one of the two signal channels 24 or 29. By varying the inserted phase shift $\Delta\phi$ in FIG. 2 greater or less than 90°, an output voltage of zero volts at the phase detector 25 may be obtained for any desired value of phase difference between signals simultaneously arriving at the apertures 33 and 34. Such a variation in phase shift introduced into one of the two signal processing channels in FIG. 2 has the effect of physically changing the boresight plane of the search radar in order to scan the entire terrain area of interest. Such a scanning technique enables the system of FIG. 2 to produce output video information for angles above and below the physical boresight plane of the antenna system and at the same time resolve the no signal-phase quadrature ambiguity inherent in the prior art system of FIG. 1.

The inserted phase shift in a system of the type shown in FIG. 2 can be controlled by a closed loop servo scan system. This will enable the servo loop to operate at the synthetic beam scan rate and thus permit the band width of the scanning servo loop to be made very narrow. A linear phase detector (not shown) in the scan servo loop is the precision element of the angle of arrival measurement system.

FIG. 4 represents the voltage versus phase angle characteristics of two commonly used phase detectors. One of these is a conventional product detector and its output is represented by the relatively high amplitude sine wave 36. The other is a so-called extended range or Kirkpatrick type detector and it is represented by the small non-symmetrical ramp function 37. The off-boresight phase monopulse radar must necessarily use the entire phase detector output as a voltage analog of angle of arrival, and if maximum sensitivity in terms of volts per degree ($\theta$) is desired, then it is necessary that the conventional product detector be used. If this is done, it is apparent that the ambiguities occur just beyond the plus and minus 90 electrical degree points with respect to the phase boresight (0 degrees). If the prior art off-boresight system cannot tolerate this close spacing of ambiguities, then it is necessary to go to the extended range detector and accept a loss of sensitivity. However, even with an extended range detector it is impossible to make the phase detector ambiguities coincide with the physical interferometer ambiguities. Only by accepting a very significant loss of sensitivity, the phase detector ambiguities can be extended to approximately the plus and minus 160 phase degrees point in the prior art off-boresight system.

The circuit of FIG. 5A, while processing many inherent advantages over the prior art off-boresight systems, has the main advantage of improving the above-described ambiguity problems by overcoming the fundamental limitations between degrees of electrical phase shift per degrees of space angle rotation in the classic prior art phase monopulse radar systems. The dual interferometer angle gating system in FIG. 5A is similar to the system in FIG. 2 and includes search radar transmitter 44 and receiver 45 and an antenna 38 to which three interferometer apertures 39, 40 and 41 are mechanically coupled. The reference aperture 39, the coarse aperture 40 and the precision aperture 41 are connected respectively to the inputs of limiting receivers 46, 47 and 48, and a local oscillator 52 is connected to the input of the mixer circuits (not shown) in the receivers 45 and 46. A pair of variable phase shifters 49 and 50 are connected between the local oscillator 52 output and the mixers in the limiting receivers 47 and 48.

A first phase detector 53 is connected between the output of the reference channel receiver 46 and the output of the coarse channel receiver 47, and a second phase detector 54 is connected between the output of the reference channel receiver 46 and the output of the precision channel receiver 48. A binary control means 55 is connected to the pair of phase detector outputs and provides a binary control for the angle gate 56. The basic difference between the system of FIG. 5A and that of FIG. 2 is the addition of a third interferometer channel. As before, a search radar illuminates the terrain area of interest and receives echoes through the antenna aperture 38 with a broad elevation pattern. These echoes are processed through a search receiving amplitude detector in the receiver 45 and applied to the input of the video gate 56. The ungated video is available for use by a ground mapping display apparatus.

The reference channel aperture 39 and the coarse channel aperture 40 are separated by a predetermined distance in order to provide a predetermined phase to space angle ratio in the near linear region around interferometer boresight. A typical experimental value of phase center displacement for the reference and coarse channel apertures is 0.637 wavelength. This spacing provides a phase to space angle ratio of 4–1. The lower interferometer precision aperture 41 has a relatively large displacement from the reference channel aperture 39 and a typical experimental value of phase center displacement between the reference and precision apertures is 3.185 wavelengths. This value of phase center displacement provides a 20–1 ratio of phase angle rotation to space angle of arrival. Since the coarse channel phase angle to space angle ratio is 4–1 in the example given and the precision channel phase angle to space angle ratio is 20–1, the "ratio of ratios" is 5 to 1. This is clearly illustrated in FIG. 5B wherein the phase detector output voltage sine wave 57 for the precision channel phase detector 54 changes at a rate 5 times that of the output voltage 58 of the coarse channel phase detector 53. This means that the precision channel phase detector has 5 times the angular measurement sensitivity of the coarse channel phase detector, but if the precision channel is used alone it would produce 5 times as many ambiguities as the coarse channel.

The control circuit 55 contains two binary generators, each having its own gating threshold level. The coarse channel produces a gate open condition to key on one of the generators when the coarse channel phase detector is equal to zero plus or minus the small coarse gating threshold level and the precision channel produces a gate open condition to key on the other generator when the phase detector 54 output voltage is zero plus or minus the precision gating threshold level. The outputs from these two binary generators are combined in an AND circuit (not shown), the output of which is applied as a controlling signal to the angle gate 56. The system in FIG. 5A requires that both phase detectors 53 and 54 must sense a null voltage between appropriate thresholds before the angle gate 56 is opened. This means that the multiple gating system retains the sensitivity of a precision detector, but it also retains the freedom from ambiguities of the coarse detector since the coarse and precision channel phase detector outputs are only coincident on the true boresight as shown in FIG. 5B.

The "ratio of ratios" chosen for experimental purposes (5 to 1) has been selected as an integer for two reasons. First, the coarse system ambiguities appear at sufficient large space angles (about ±51.25 degrees) to put the ambiguities well beyond the amplitude pattern coverage for the search radar antenna, and secondly the mechanization of the scan generator is simplified with this integral "ratio of ratios."

The threshold gating levels (FIG. 5B) are not critical for either channel and the precision threshold level determines the effective angular width of the synthetic beam during active scan. For a typical mechanization, the precision gating threshsolds have been set equivalent to ±2.5 phase degrees. This threshold level provides a synthetic beam width of 0.25 space degree. (See FIG. 5C.)

In FIG. 5C there are shown two extraneous ambiguous precision beams 59 and 60 outside the coarse beam, and only one bonafide precision beam 61 bracketed by the coarse beam 62. In order to be detected, the target must appear within both the precision and the coarse beams, and this occurs at a scan angle $\phi$ in FIG. 5C.

There is always a possibility of a small phase tracking error between the reference channel and both the coarse and precision channels. This phase tracking error results in an error in location in the center of the beam. Because of the interferometer ratio selected, an error in tracking effects the location of the center of the coarse beam at a magnitude five times greater than an equal tracking error does in the center of the precision beam. Therefore, the coarse beam must be made broad enough to intercept the precision beam at all times, and the coarse beam must be made wide enough to accommodate the maximum phase tracking error in opposite directions in the coarse and precision channels. The coarse beam must at the same time be sufficiently narrow so that there is never a possibility of intercepting an ambiguous precision beam. The three degree space beam width shown in FIG. 5C is adequate to meet the above criteria.

Since the phase of the ouput voltage at phase detector 54 is varying at a rate five times that of the output voltage at phase detector 53, the precision channel phase shifter 50 must operate at a rate five times that of the coarse channel phase shifter 59 to permit synchronous space angle scanning. Since an integral number for the "ratio of ratios" is used, both the coarse and precision channels can be controlled by a single function generator and a single control loop which is illustrated in FIG. 6. This synchronous control feature will be explained later with reference to the frequency synthesizer 63 in FIG. 6.

The dual conversion receiver shown in FIG. 6 includes an input section 42 of microwave plumbing for providing an initial frequency conversion of the incoming reference, coarse and precision signals from the three channel apertures (not shown) to provide a 65 megacycle intermediate frequency input to the preamplifier assembly 43. Each channel in the input section 42 includes a microwave T network 64 for summing an initial local oscillator signal and a reference, coarse and precision channel signal respectively. Each channel also includes first detector 66 for heterodyning the local oscillator signal with the reference, coarse and preciison signals and a load isolator 65 coupled between the output of the microwave T 64 and the input of the first detector 66 for preventing changing characteristics of the first detector 66 to be reflected into the microwave linear T network 64.

The outputs of the three first detectors 66 in the reference, coarse and precision channels are connected initially to a preamplifier 67 in the preamplifier assembly 43 and thereafter applied to mixers 68, 69 and 70 for mixing with another local oscillator signal from the frequency synthesizer 63 to be described. The outputs of the mixers 68, 69 and 70 are applied to a post amplifier assembly 51, including the 25 megacycle IF post amplifiers 72 and coarse and precision phase detectors 73 and 74 identical to the phase detectors 53 and 54 in the system of FIG. 5A.

The local oscillator signals for the three interferometer IF channels in the preamplifier assembly 43 are connected from outputs 90, 91 and 92 of the frequency synthesizer 63 to the mixers 68, 69 and 70. This frequency synthesizer permits the necessary synchronized scanning for both the coarse and the precision interferometer channels by means of a single control element. The phase-controlled local oscillator signals for the preamp assembly 43 are generated by a single 18 megacycle crystal controlled oscillator 75, the output of which is split into paths 86, 87, 88 and 89.

Path 89 is connected to the input of the ×5 multiplier 83, and the output of this multiplier is connected to the input of the reference channel mixer 68. The output of the multiplier 83 is a 90 megacycle undelayed signal.

Another path 86 is connected to a variable delay line 81 which provides a phase shift in the oscillator signal prior to entering the ×5 multiplier 84 and the mixer 82. The output of the ×5 multiplier 84 is connected to the precision channel mixer 70 and this signal contains five times the phase delay that was induced by the variable delay line 81 in the original 18 megacycle signal. The underlayed signal is applied via path 88 to the ×4 multiplier 80 and thereafter mixed with the delay signal from the output of the variable delay line 81 in the mixer 82. This mixer, a single side band device, provides a 90 megacycle signal with a phase delay equivalent to that imposed on the 18 megacycle signal by delay line 81, and the output of mixer 82 is fed to the coarse channel mixer 69. From this arrangement it can be seen that the precision signal phase delay is always five times the coarse signal phase delay, and the phase delay in both the precision and coarse channels may be synchronously controlled by a delay line control element 94.

To control the variable line 81 in order to insure an accurate phase shift in the local oscillator signals applied to the mixers 69 and 70, a second oscillator 77 is provided in a closed loop arrangement. Both the delayed and underlayed 18 megacycle signals are fed to the mixers 78 and 79 and mixed with the 18.1 megacycle signal from the output of the oscillator 77. Each of these mixers 78 and 79 generates a difference frequency of 100 kc. The two 100 kc. difference signals contain the phase shift that is superimposed on the 18 megacycle signal by the variable delay line 81, and these 100 kc. continuous wave signals are applied to a precision linear phase detector (not shown) where the phase shift is precisely measured. This device is the precision element of the radar system. The phase detector output is compared to a scan control voltage, and the error voltage which is developed is used to control the delay in line 81.

It is apparent from the foregoing description that the multiple interferometer angle gated system represents a major advancement in the field of radar. In addition to the advantages previously stated regarding the resolution of the prior art physical and electrical ambiguities, the on-boresight phase monopulse techniques minimize the effects of amplitude scintillation and minimize error due to low amplitude target returns. This is obvious since the above described system is completely insensitive to the amplitude variations in the incoming reflected signals from the terrain or other radar targets. In the on-boresight system described above, it is unnecessary to preserve voltage analog information beyond the angle gating circuitry. The angle measurement has already been made by the precision scanning loop. It is only necessary for the phase detector angle gate system to make a "yes" or "no" digital decision concerning the presence or absence of an on-boresight signal in each radar range element.

I claim:
1. A radar sensing system including in combination:
    (a) reference, coarse and precision channels for processing signals emanating from a single source,
    (b) means connected in said reference channel for receiving signals from said source,
    (c) means connected in said coarse channel for receiving signals from said source and spaced a first predetermined distance from said reference channel receiving means,
    (d) means in said precision channel for receiving signals from said source and spaced a second predetermined distance from said reference channel receiving means, said coarse channel receiving means and said precision channel receiving means being mounted on one side of the boresight plane of said radar sensing system and said reference channel receiving means being mounted on the other side of said boresight plane and being separated a greater distance from said precision channel receiving means than said coarse channel receiving means, thereby enabling a greater phase variation between signals simultaneously arriving at said reference channel receiving means and said precision channel receiving means for a given variation in angle at which signals emanating from said source intersect said boresight plane than the phase variation between signals simultaneously arriving at said reference channel receiving means and said coarse channel receiving means,
    (e) first comparison means for comparing the phase difference between signals simultaneously arriving at said reference channel receiving means and said coarse channel receiving means,
    (f) second comparison means for comparing the phase difference between signals arriving at said reference channel receiving means and said precision channel receiving means, and
    (g) gating means connected to the outputs of said first and second comparison means and responsive only to a predetermined output voltage level at the outputs of said first and second comparison means for passing signals received from said source.
2. The system of claim 1 which further includes first and second phase scanning means connected respectively to said coarse and precision channels for synchronously varying the phase difference between signals in said coarse and precision channels in proportion to the ratio of phase variation in signals arriving at said coarse and precision channel receiving means.
3. The system according to claim 2 which further includes:

(a) local oscillator means connected to each of said reference coarse and precision channels, (b) means in said reference, coarse and precision signal processing channels for mixing signals from said local oscillator means with signals received at said reference, coarse and precision channel receiving means, (c) said first phase scanning means including a first variable phase shifter connected between said local oscillator means and the input of said coarse signal processing channel for varying the phase of the output signal from said coarse signal processing channel, (d) said second phase scanning means including a second phase shifter connected between said local oscillator means and the input of said precision signal processing channel for varying the phase of the output signal from said precision signal processing channel, (e) said first phase comparison means including a first phase detector connected to the outputs of said reference and coarse signal processing channels, and (f) said second phase comparison means including a second phase detector connected to the outputs of said reference and precision signal processing channels.

4. The system according to claim 3 which further includes control means connected to the outputs of said first and second phase detectors and connected to the input of said gating means for enabling said gating means to pass signals received from said source only when the outputs of said phase detectors are equal to zero plus or minus a given threshold voltage level of said first and second phase detectors.

5. The system according to claim 1 wherein:

(a) each of said reference, coarse and precision signal processing channels includes means for mixing signals at said reference, coarse and precision channel receiving means with a signal from a local oscillator to provide an intermediate frequency output signal at the input of said first and second comparison means; said system further including, (b) variable delay means connected to the output of said local oscillator for varying the phase of a local oscillator signal injected into said precision channel mixing means a predetermined number of cycles greater than the delay of local oscillator signals injected into said coarse channel mixing means whereby phase scanning in said coarse and precision signal processing channels is accomplished by a single local oscillator.

6. The system of claim 5 wherein said variable delay means includes:

(a) a variable delay line connected to the output of said local oscillator, (b) a first frequency multiplier connected between the output of said delay line and the input of said precision channel mixing means, (c) a second frequency multiplier connected to the output of said local oscillator, (d) a mixer connected to the outputs of said variable delay line and said second frequency multiplier for providing an output signal having the same frequency as the output signal from said first multiplier and delayed a predetermined fraction of the delay introduced into the output signal of said first frequency multiplier, (e) means for connecting the output of said mixer to the input of said coarse channel mixing means, and (f) means coupled to said delay line for controlling the phase of local oscillator signals introduced into said coarse and precision signal processing channel.

7. The system according to claim 6 wherein said reference, coarse and precision channels each include:

(a) an input linear T microwave network, (b) means for adding the input signals at said reference, coarse and precision channel receiving means to another local oscillator signal in said linear T microwave network in each of said reference, coarse and precision channels, (c) first detector means for heterodyning said input and said signals from said another local oscillator in each of said reference, coarse and precision channels, (d) a load isolator connected between said first detector means and said linear T microwave network in each of said reference, coarse and precision channels for preventing changing characteristics of said first detector means to be reflected into said linear T network, (e) means for applying the outputs of said first detector means in each of said reference, coarse and precision channels to the inputs of said mixing means in each of said channels respectively, and (f) control means connected to the outputs of said first and second comparison means and responsive to a zero voltage level at the outputs of said first and second comparison means for enabling said gating means to pass signals received from said source.

8. A radar receiver having antenna means for intercepting a signal from a single source, including in combination, a plurality of phase comparison means each having two input connections and one output connection and supplying phase comparison indicating signals to said output connection, a greater plurality of signal processing channels each having a signal receiving element receiving signals from the single source and with a limiting receiver supplying limited signals, derived from the respective received signals, each of said comparison means receiving two of said limited signals, respectively, from two channels, each comparison means receiving two signals being unique to such comparison means, control means connected to said output connections and responsive to said indicating signals on said output connections indicating a predetermined phase comparison in at least one of said comparison means to supply a first binary signal and at other times supply a second binary signal, and means responsive to said binary signals to accept or reject signals intercepted by said antenna means in accordance with said binary signals.

9. The receiver of claim 8 wherein said control means is jointly responsive to a plurality of said phase comparison means indicating said predetermined phase comparison to supply said first binary signal.

10. The receiver of claim 9 wherein said control means is jointly responsive to all said phase comparison means indicating a zero phase difference within predetermined gating threshold levels to supply said first binary signal, and said means responsive to said binary signals being a radar signal gating means and said first binary signal being a gate enabling signal and said second binary signal being a gate disabling signal.

11. A radar sensing system including in combination, first receiving means having a pair of spatially separated signal receiving elements intercepting signals arriving substantially simultaneously from a single source, phase detector means receiving said intercepted signals from said elements and supplying an output signal indicative of phase differences between said intercepted signals, second receiving means continuously intercepting signals from said single source and supplying an output signal indicative of the intercepted signals, control means responsive to said phase detector means supplying a signal indicating zero phase difference to supply a gate enabling signal and further responsive to said phase comparison means supplying a non-zero phase indicating signal to supply a gate disabling signal, gating means connected to said control means and to said second receiving means and jointly responsive to said second receiving means supplied signal and to said gate enabling signal to supply an output signal and at other times to supply no output signal, and said zero phase indicating signal being supplied by said phase detector means between plus and minus gating threshold phase differences about a zero phase difference.

12. The system of claim 11 further including a signal amplitude limiting processing channel electrically interposed between each of said signal receiving elements and said phase detector means.

References Cited
UNITED STATES PATENTS

| | | | |
|---|---|---|---|
| 2,931,032 | 3/1960 | Newhouse | 343—119 |
| 3,079,600 | 2/1963 | Dahlin | 343—16 X |
| 3,153,234 | 10/1964 | Begeman et al. | 343—16 |
| 3,235,867 | 2/1966 | Wirth | 343—16 |

RODNEY D. BENNETT, *Primary Examiner.*

J. P. MORRIS, *Assistant Examiner.*